United States Patent [19]
Hileman, Jr.

[11] Patent Number: 5,784,908
[45] Date of Patent: *Jul. 28, 1998

[54] AUTOMOBILE ANTI-THEFT DEVICE

[76] Inventor: Robert A. Hileman, Jr., 286 Katie Dr., Feasterville, Pa. 19053

[*] Notice: The term of this patent shall not extend beyond the expiration date of Pat. No. 5,673,577.

[21] Appl. No.: 735,606

[22] Filed: Oct. 23, 1996

Related U.S. Application Data

[63] Continuation-in-part of Ser. No. 476,700, Jun. 7, 1995, Pat. No. 5,673,577.

[51] Int. Cl.⁶ ............................................. B60R 25/02
[52] U.S. Cl. ........................ 70/209; 70/226; 70/213; 70/214
[58] Field of Search ................ 70/209–214, 224–226, 70/237, 238, 207

[56] References Cited

U.S. PATENT DOCUMENTS

| | | | |
|---|---|---|---|
| 1,530,861 | 3/1925 | Standen | 70/214 |
| 1,608,539 | 11/1926 | Wetherell | 70/214 |
| 1,966,334 | 7/1934 | Cruse | 70/213 |
| 2,119,704 | 6/1938 | Denerich | 70/213 |
| 4,103,524 | 8/1978 | Mitchell | 70/209 |
| 4,175,410 | 11/1979 | Schwaiger | 70/209 |
| 4,304,110 | 12/1981 | Fain | 70/209 |
| 4,738,127 | 4/1988 | Johnson | 70/209 |
| 5,014,529 | 5/1991 | Wu | 70/209 |
| 5,052,201 | 10/1991 | Liou | 70/209 |
| 5,097,685 | 3/1992 | Lien | 70/211 |
| 5,131,245 | 7/1992 | Chen | 70/209 |
| 5,138,853 | 8/1992 | Chen | 70/209 |
| 5,144,822 | 9/1992 | Jan | 70/209 |
| 5,174,138 | 12/1992 | Shen | 70/209 |
| 5,197,308 | 3/1993 | Pazik | 70/209 |
| 5,199,284 | 4/1993 | Lin | 70/209 |
| 5,230,232 | 7/1993 | Yang | 70/226 |
| 5,239,849 | 8/1993 | Gallardo | 70/209 |
| 5,327,753 | 7/1994 | White | 70/209 |
| 5,359,869 | 11/1994 | Chen | 70/209 |
| 5,375,441 | 12/1994 | Liou | 70/209 |
| 5,381,679 | 1/1995 | Cummins | 70/209 |
| 5,454,240 | 10/1995 | Whitney | 70/226 |
| 5,653,132 | 8/1997 | Coto | 70/209 |

*Primary Examiner*—Steven N. Meyers
*Assistant Examiner*—Gary Estremsky
*Attorney, Agent, or Firm*—Volpe & Koenig, PC

[57] ABSTRACT

A tamper-resistant anti-theft device inhibits rotation of a vehicle steering wheel thus preventing theft of the vehicle and discouraging theft of the driver's side air bag.

16 Claims, 7 Drawing Sheets

AUTOMOBILE ANTI-THEFT DEVICE

This application is a continuation-in-part of application Ser. No. 08/476,700, filed Jun. 7, 1995 now U.S. Pat. 5,6673,577.

BACKGROUND OF THE INVENTION

1. Field of the Invention

This invention generally relates to vehicle anti-theft devices. More particularly, the invention relates to devices of the type which are attached to a vehicle steering wheel to prevent or limit rotation and removal thereof.

2. Description of Related Art

A number of different vehicle anti-theft devices of the type which are attachable to a steering wheel are presently known. In one common form, the device includes two hooked portions that engage diametrically opposite portions of the steering wheel. Normally such devices can be extended to accommodate a variety of steering wheel widths and placements. These devices also include a member which extends beyond the steering wheel periphery to engage a portion of the vehicle interior or the operator so that steering wheel rotation is limited. Examples of such devices are shown in U.S. Pat. Nos. 4,103,524 (Mitchell), 4,738,127 (Johnson), 5,144,822 (Jan). U.S. Pat. No. 4,103,524 further discloses a device wherein the space in between the hooks is fixed. U.S. Pat. No. 4,738,127 discloses an anti-theft device which is telescopic to adjust for varying steering wheel widths. U.S. Pat. No. 5,144,822 further discloses a telescopic anti-theft device with a reinforced locking mechanism.

The devices that are presently known are often relatively complex and their locking mechanisms do not provide the desired degree of security due to the open exposure of the locking mechanism itself. In addition, most existing devices are telescopic and variable in length, which makes them easily subverted by the cutting of the rim of the steering wheel. Most of the known devices also do not provide additional protection of the center area steering wheel to prevent removal of the vehicle's supplemental restraint system.

SUMMARY OF THE INVENTION

A preferred embodiment of the invention comprises a tamper resistant automobile anti-theft device for attachment to steering wheels of a selected size. The device includes an elongated bar, having a length greater than the steering wheel diameter. At one end of the elongated bar is a hook and a first spacer for engaging a first portion of the steering wheel. A second spacer extends from the bar and engages a diametrically opposed portion of the steering wheel. A closing latch is slidably mounted on the bar. When the closing latch is in a closed position, the second portion of the steering wheel is enclosed between the closing latch, the second spacer and the bar. A lock covering handle projects from the closing latch a distance away from a front surface of the bar. A lock is attached to the handle for securing the closing latch. When the closing latch is in the closed position, the handle covers the lock.

The present invention provides a tamper resistant vehicle security device for reducing the risk of vehicle theft.

The present invention provides a locking device wherein the locking mechanism is protected from tampering.

The present invention provides a vehicle anti-theft device which inhibits steering wheel and supplemental restraint system removal.

DETAILED DESCRIPTION OF THE PREFERRED EMBODIMENT

Figure 1:
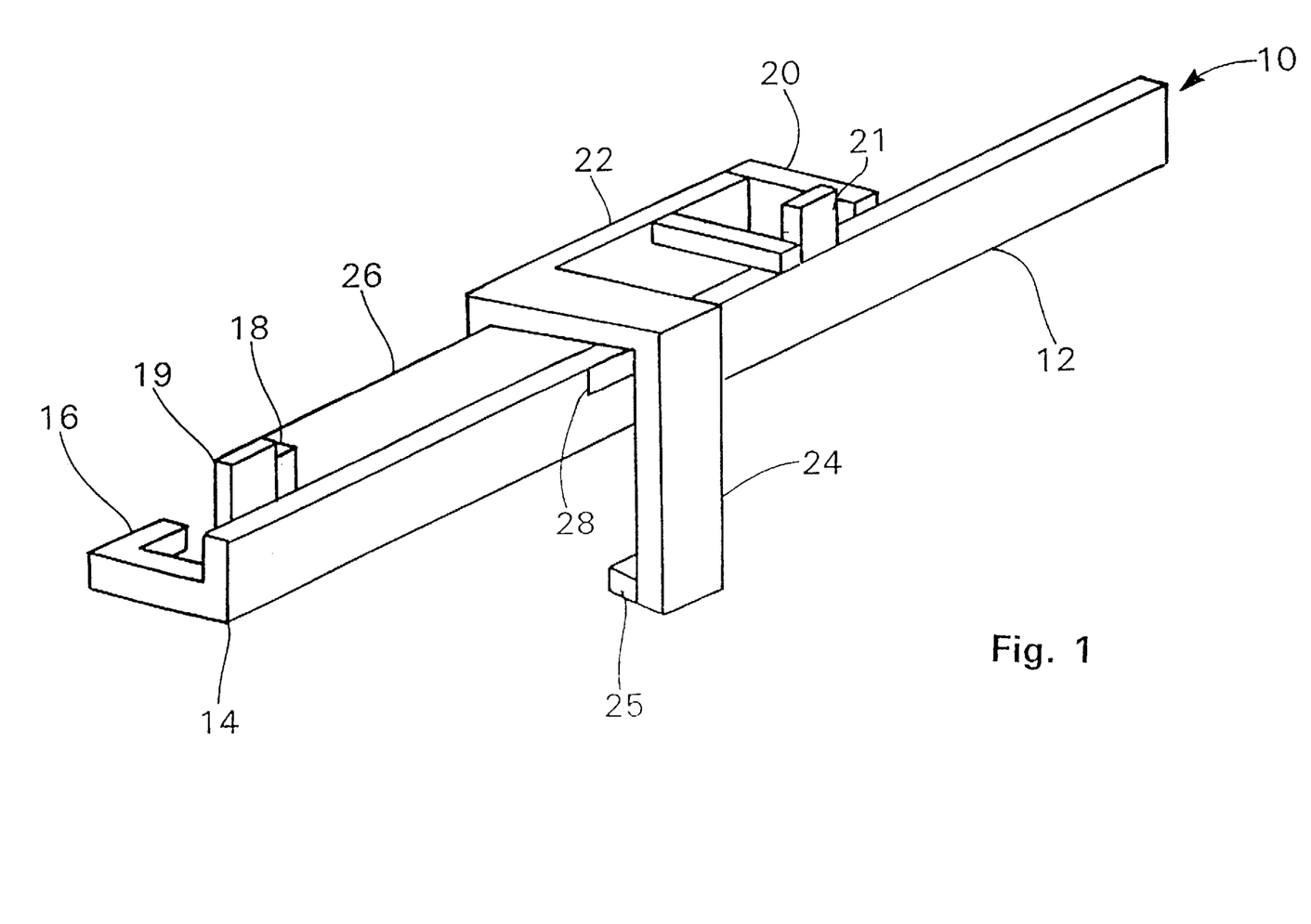
FIG. 1 is an isometric view of a preferred embodiment of the present invention in a locked position.

Referring to FIG. 1, there is illustrated a tamper resistant anti-theft device, according to the present invention. The device 10 includes an elongated bar 12 which is preferably solid and of rectangular cross section. At a first end of the bar 12 is an L-shaped hook 16 and a substantially rectangular first spacer 18 for engagement with a first portion of a steering wheel. A closing latch 22 and handle 24 are slidably mounted to the bar 12 along guide box 26. Projecting from latch 22 is a crossbar 22A. The latch 22 is moved longitudinally along the bar 12 to a closed position where it abuts a second, substantially rectangular, spacer 20. When closing latch 22 is in the closed position, an enclosure for confining a second, diametrically opposed portion of the steering wheel 27 is defined by the latch 22, the crossbar 22A, the second spacer 20 and the elongated bar 12. Lock 28 is used to secure the closing latch 22 in the closed position. The device also has reinforcing block 19 attached to the bar 12 and reinforcing block 21 attached to the crossbar 22A.

Figure 2:
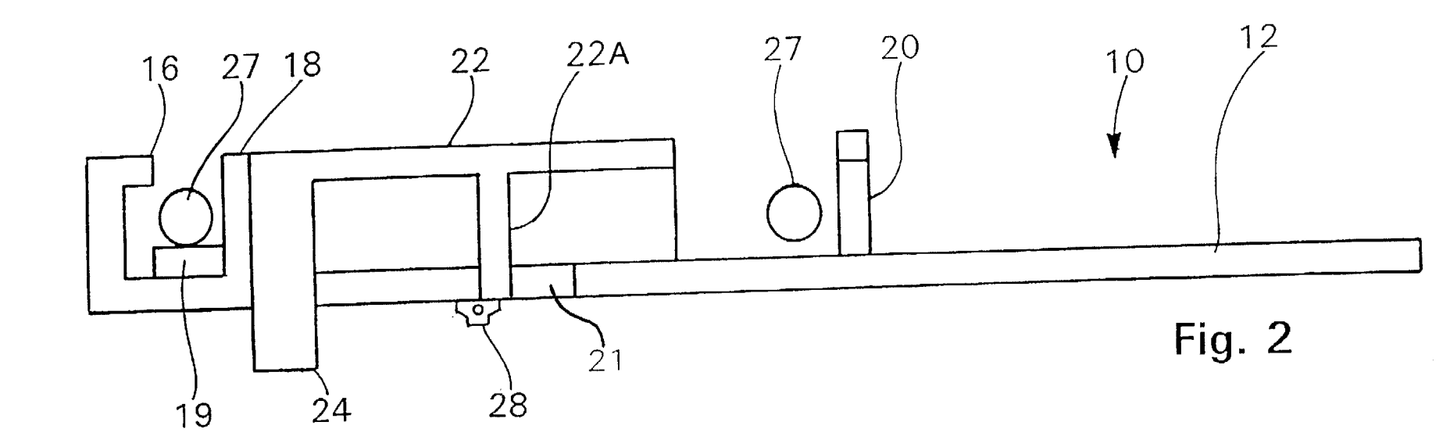
FIG. 2 is a top plan view of the preferred embodiment in an opened position.
Figure 3:
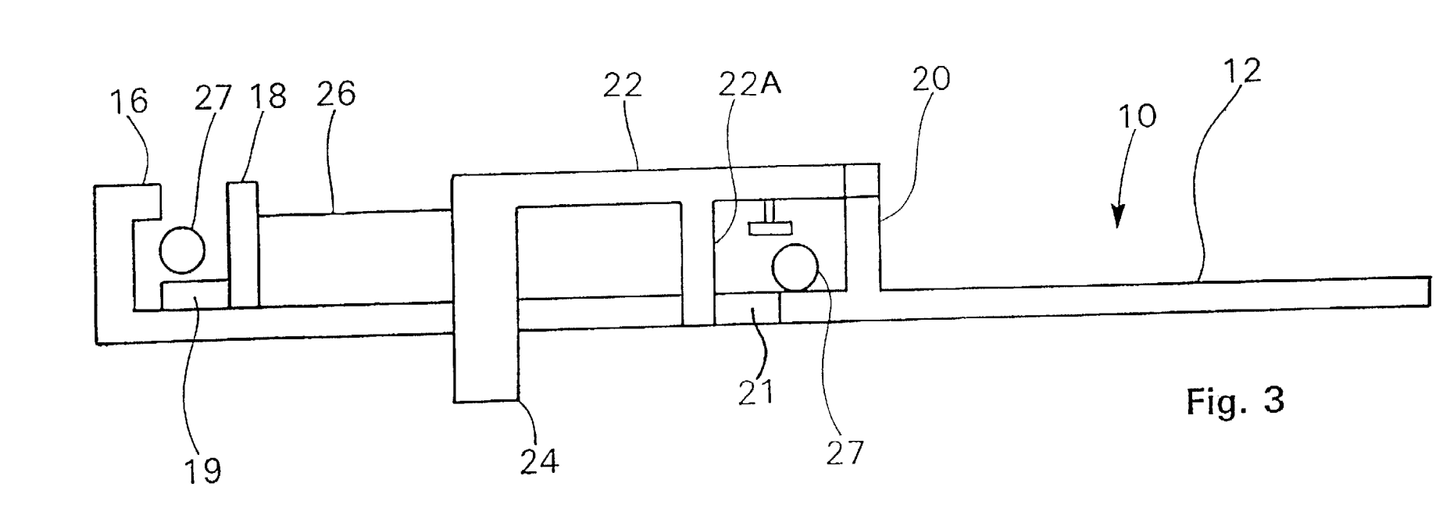
FIG. 3 is a top plan view of the preferred embodiment in a locked position.

As shown in FIG. 2, the first block 19 is positioned between hook 16 and spacer 18. The block 19 reinforces the steering wheel engagement area defined by the hook 16 and the spacer 18 so as to further limit any movement of the steering wheel 27 within the hook 16 and spacer 18. As shown in FIG. 3, upon closing the latch 22, the second reinforcing block 21 abuts a second inside portion of steering wheel rim 29 to inhibit movement of the enclosed portion of the steering wheel 27 and thus prevent any shimmying back and forth of the device 10.

Operation of the device is explained with reference to FIGS. 2 and 3. The device 10 is positioned so that the hook 16 and the first spacer 18 engage one portion of the steering wheel 27. The device is then positioned such that the second spacer 20 engages a second portion of the steering wheel 27. The handle 24 is slid along the bar 12 to a closed position, shown in FIG. 3, in which the latch 22 abuts with the second spacer 20. In the closed position, the second portion of the steering wheel 27 is secured within the space defined by the closing latch 22, the crossbar 22A, the spacer 20 and the elongated bar 12.

Figure 4:
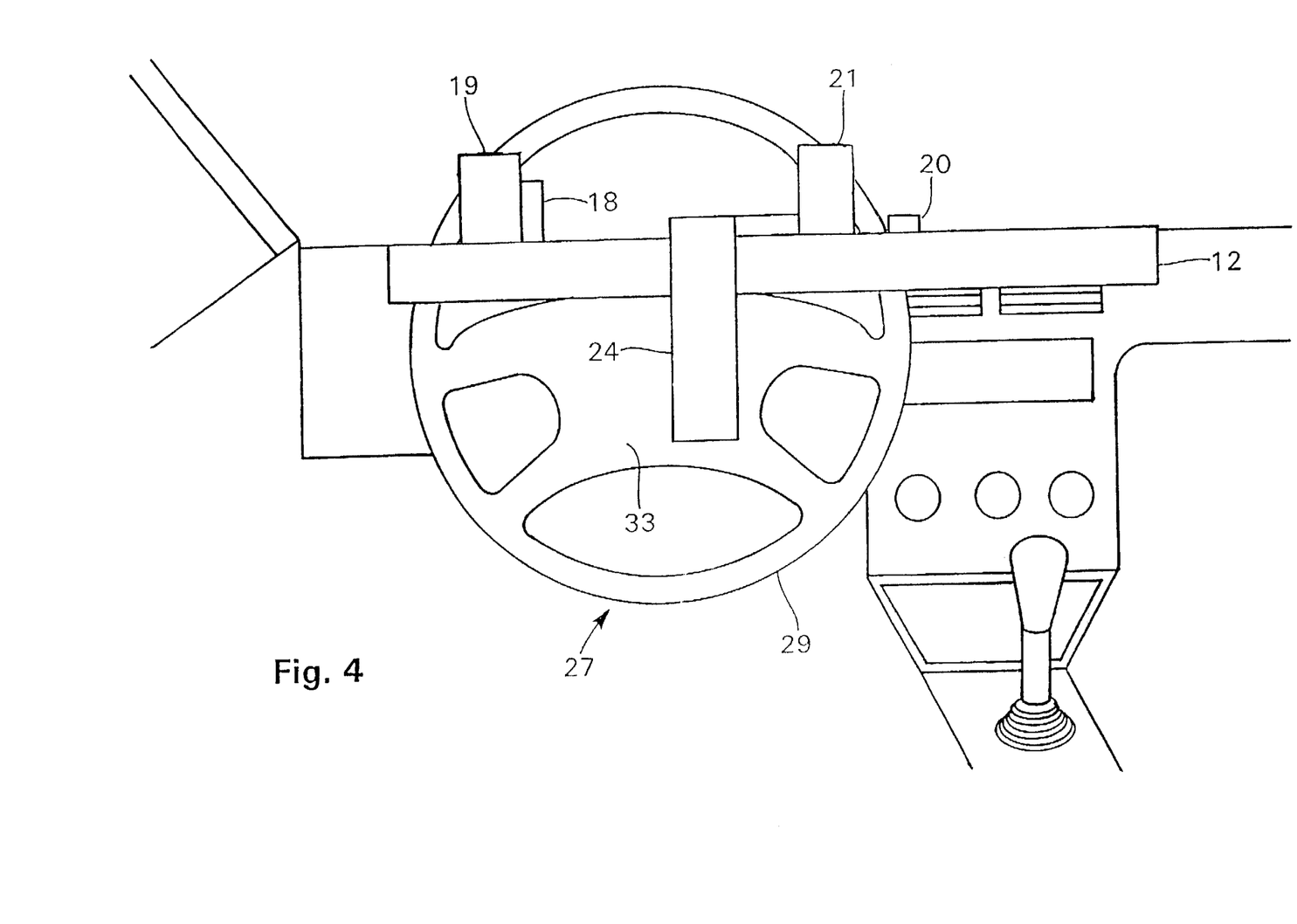
FIG. 4 is a schematic view showing the anti-theft device on a steering wheel.

FIG. 4 shows the anti-theft device 10 locked onto a steering wheel 27. Block 19 extends along the steering wheel 27 so as to prevent cutting of a portion of the steering wheel 27 located immediately above the hook 16 (not shown) and first spacer 18. Thus the device 10 cannot be slid upward and off the steering wheel 27. This block 19 also aids in preventing the steering wheel from being cut right along hook 16 (not shown). The second reinforcing block 21 is positioned to prevent the cutting of a portion of the steering wheel immediately above the second inside portion of the steering wheel rim 29. Also, when the latch 22 is in the closed position, the handle 24 covers the center hub of the steering wheel 27 to prevent air bag theft.

Figure 5:
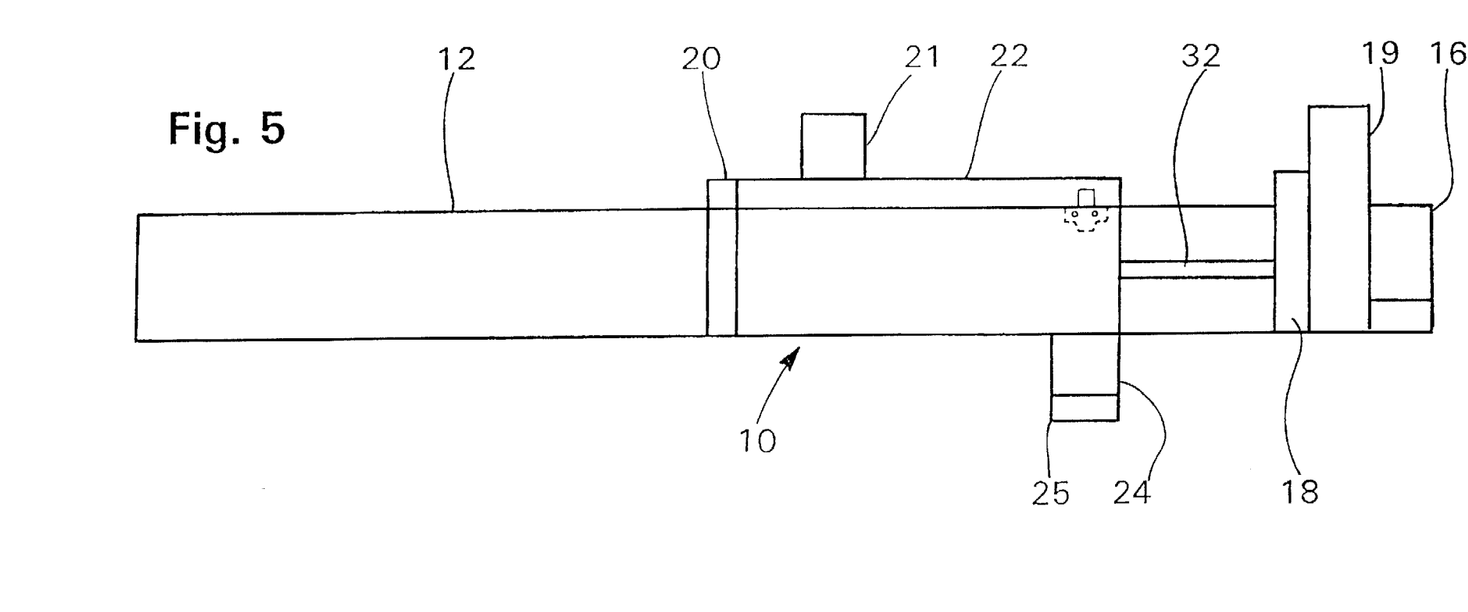
FIG. 5 is a rear elevation of the preferred embodiment in a locked position.
Figure 6:
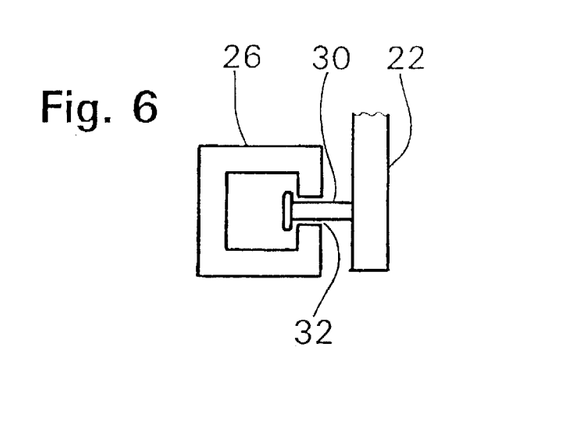
FIG. 6 is a diagrammatic section of the guide pin and sliding box.

As shown in FIGS. 5 and 6, a guide pin 30 guides movement of the latch 22 through a hollow guiding box 26. A longitudinal groove 32 is displaced along the length of box 26. The pin 30 travels back and forth within the groove 32 to guide movement of the latch 22. The guide box 26 abuts one side of the spacer 18, further reinforcing the first engagement area. The guide box 26 is positioned so as to also rest inside a top open cut-out portion of the steering wheel 27 (not shown) which further prevents sliding movement of the device 10. A single pin 30 may be employed, but multiple pins 30 are preferred to allow for uniform tracking of the latch 22.

Figure 7:
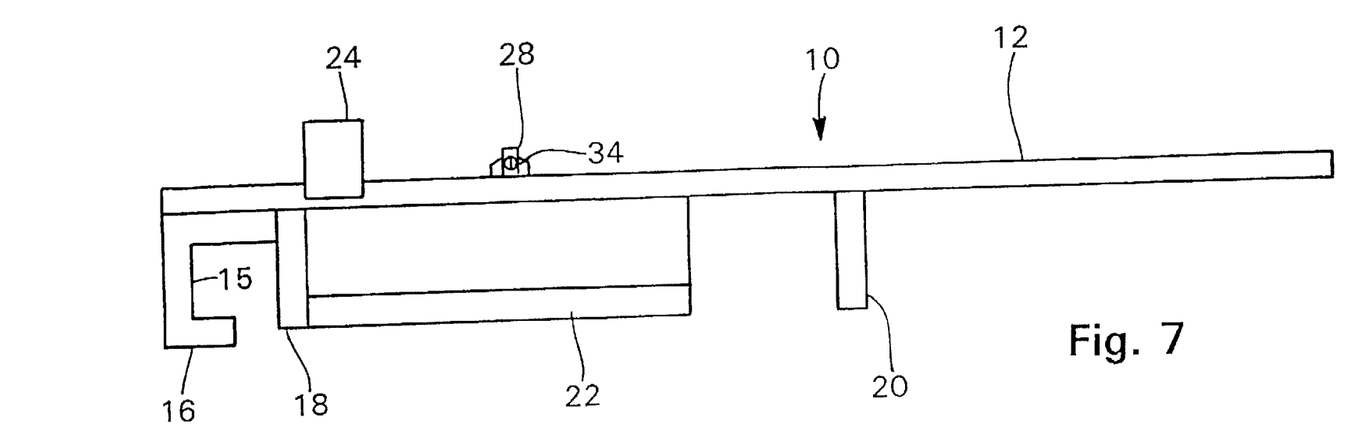
FIG. 7 is a bottom plan view of the preferred embodiment.
Figure 8:
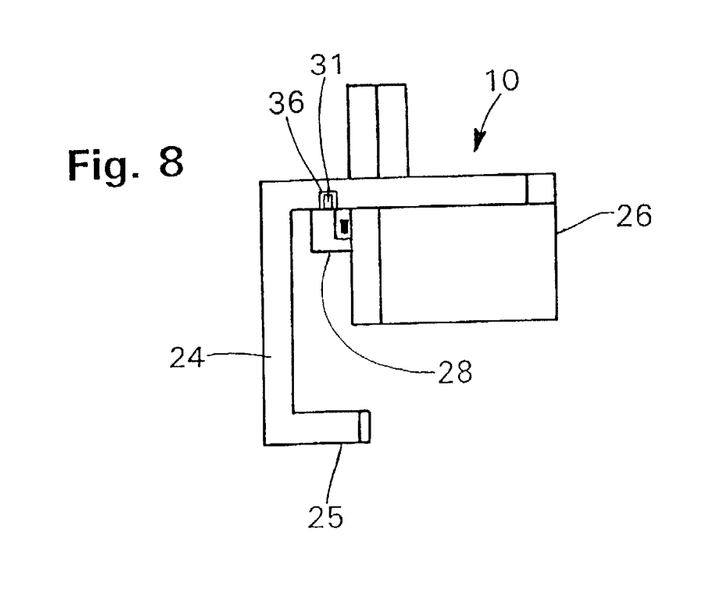
FIG. 8 is a right side view of the preferred embodiment.

As shown in FIGS. 7 and 8, the lock means 28 is fixedly mounted to the front surface of the bar 12. The lock means 28 is located along the bar so that it is hidden behind the overhanging handle 24 when the device 10 is locked. The space between the front surface of the bar 12 and the handle 24 is determined by the overhang of handle 24 from the bar 12. The space is sufficient to allow a typical person to fit their hand in between the handle 24 and the bar 12 for operation of the lock 28. The handle 24 further has an aperture 36 disposed on an underside surface. As shown in FIG. 7, a key, not shown, is inserted into a key receiving slot 34 to engage a lockpin 31. The lockpin 31 is extendable into and retractable from the aperture 36 by the key for locking and unlocking the device 10. To properly lock the device 10, the latch 22 must be slid along the bar 12 until the latch 22 abuts with the second spacer 20.

To further increase security and prevent tampering with the lock, a handle flange 25 provides an additional obstruction for direct access to the key receiving slot 34 of the lock 28, making it difficult to insert a picking implement directly into the keyhole, thus deterring picking or prying of the lock 28.

Figures 9, 10:
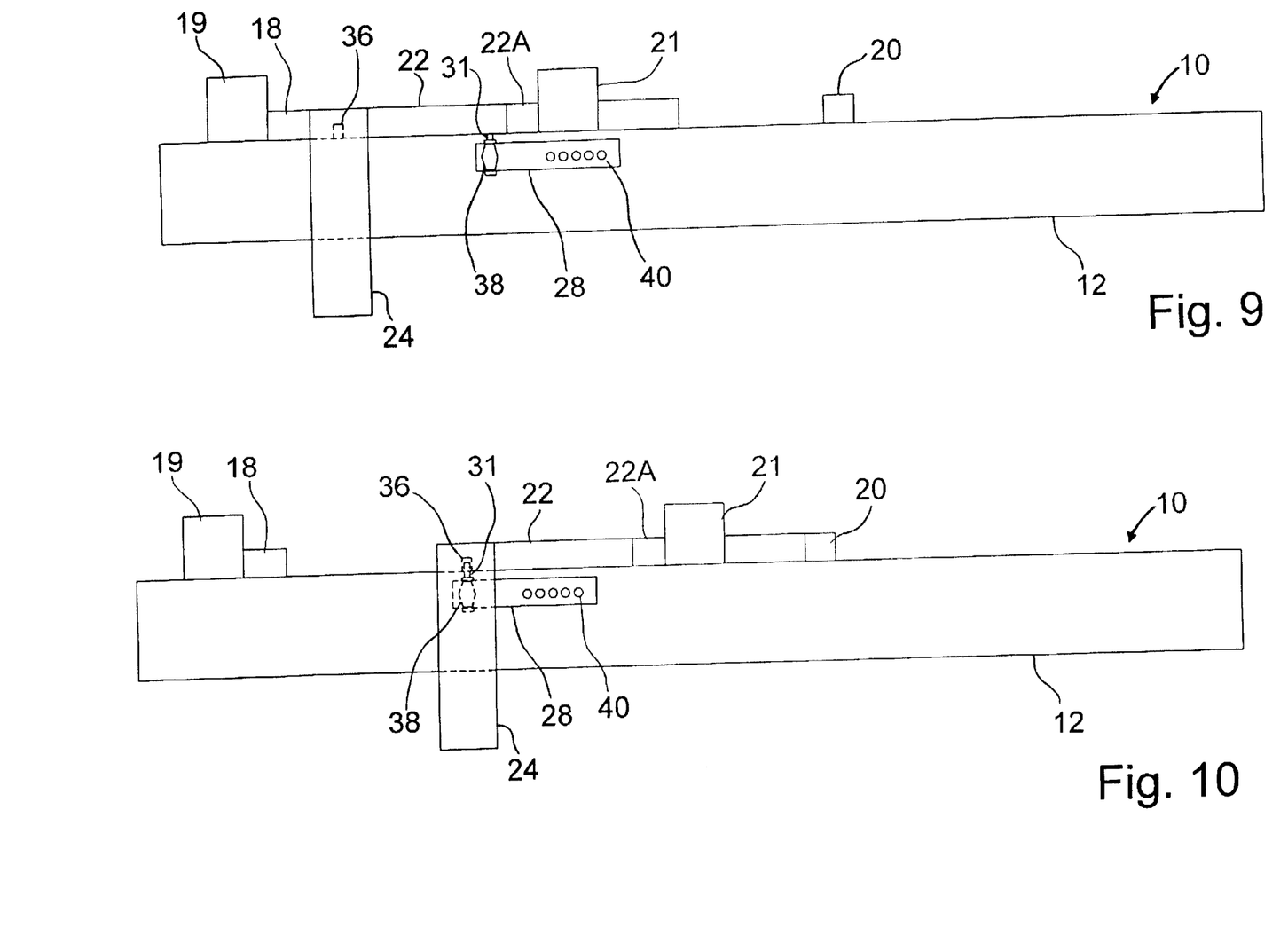
FIG. 9 is a front elevation of an alternative embodiment in an opened position.
FIG. 10 is a front elevation of an alternative embodiment in a closed position.
Figure 11:
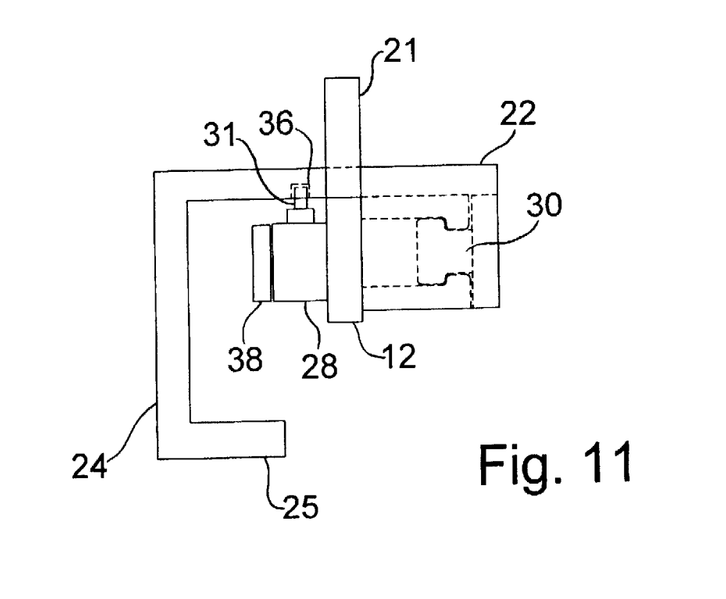
FIG. 11 is a right side view of the alternate embodiment.

FIGS. 9-11 show an alternate embodiment of the device 10 wherein the locking means 28 is a push button combination lock. The device 10 is positioned onto a steering wheel 27 in the same manner as described in the preferred embodiment. When the closing latch 22 is in the closed position, instead of inserting and turning a key to extend the lock pin 31, the user instead turns the turn pin knob 38 to extend the lock pin 31. When the closing latch 22 is in the closed position, the turn pin knob 38 and lock pin 31 are covered by handle 24. While the handle 24 may be sized so as to cover the entire push button combination lock it, is not necessary as there is no key opening which needs to be concealed or protected from tampering. The handle 24 is a sufficient distance from the front of the elongated bar 12, so that a user can reach and maneuver the turn pin knob 38. When the user wants to unlock the device 10, the user enters the required combination using the push buttons 40. Once the combination has been entered, the user turns the turn pin knob 38 to retract the lock pin 31. The user then slides the closing latch 22 to the open position and removes the device 10. An acceptable push button lock is the Cross Throw Model SMC available from Simplex Access Controls, Corp of Winston Salem, N.C. 27115-4114.

The components of the anti-theft device 10 of the invention are all preferably constructed of a metal which may be treated with a corrosion inhibitor or alternatively comprised of a corrosion resistant or plasma treated metal. Furthermore, the interior surface of the hook 16 and the first spacer 18 may be covered with a resilient padding or sleeve, not shown, so as not to damage the steering wheel rim. The device as described is simple in construction, but is highly effective as a theft-proof or tamper-resistant locking device for preventing unauthorized use of a vehicle, or theft of the vehicle's air bag.

I claim:

1. A tamper resistant anti-theft device for attachment to an automobile steering wheel having a center mounted air bag and an exterior diameter of a selected size, the anti-theft device comprising:

a bar having first and second ends and adapted to have a length greater than the exterior diameter of the steering wheel;

a first means fixed at the first end of the bar for engaging a first portion of the steering wheel;

a second means fixed on the bar at a position between the ends thereof for engaging a second portion of the steering wheel;

a closing latch mounted between the first and second means of the bar for movement from an opened position to a locked position that confines the second portion of the steering wheel between the closing latch and the second means;

reinforcement means for limiting movement of the device and preventing the cutting of an adjacent portion of the steering wheel;

a covering member attached to and movable with the closing latch to the locked position where it overlies the center mounted air bag; and a locking means for locking the closing latch in the locked position secured to the bar at a position which is concealed beneath the covering member when the closing latch is in the locked position.

2. The device according to claim 1 wherein said locking means includes:

a locking pin extendable into an aperture on an underside surface of said covering member so as to secure said closing latch against movement relative to said first engaging means.

3. The device according to claim 2 wherein said locking means further comprises:

a key receiving opening.

4. The device according to claim 2 wherein said locking means further comprises:

a push button combination lock.

5. A tamper resistant anti-theft device for attachment to an automobile steering wheel having a center mounted air bag and an exterior diameter of a selected size, the anti-theft device comprising:

an elongated bar having first and second ends and adapted to have a length greater than the exterior diameter of the steering wheel to which the anti-theft device is to be attached;

engaging means fixed at the first end of said bar for engaging a first portion of the steering wheel, said engaging means including a hook and a first spacer;

a second spacer fixed at a position between the ends of said bar for engaging a second opposed portion of the steering wheel;

a closing latch mounted on said bar by a pin assembly for movement from an opened position to a closed position, said closing latch, said bar and said second spacer defining an enclosure for confinement of the second portion of the steering wheel when said closing latch is in said closed position;

reinforcement means for limiting movement of the device and preventing the cutting of an adjacent portion of the steering wheel;

a lock covering handle attached to and extending away from said closing latch and projecting a distance away from a front surface of said bar, said handle sized so as to cover a portion of the center area of the steering wheel; and a locking means for locking the closing latch in the closed position fixedly attached along said bar, said locking means positioned between said front surface of said bar and an inside surface of said handle when said closing latch is in said closed position.

6. The device according to claim 5 wherein said pin assembly comprises:

a slide pin mounted on an inside surface of said closing latch; and a hollow guide box mounted on a rear surface of said bar, said guide box having a longitudinal groove extending along the length thereof for interaction with said slide pin to guide the longitudinal movement of said closing latch along said bar.

7. A The device according to claim 5 wherein said locking means includes:

a locking pin extendable into an aperture on an underside surface of said handle so as to secure said closing latch against movement relative to said first engaging means.

8. The device according to claim 7 wherein said locking means further comprises:

a key receiving opening.

9. The device according to claim 8 wherein said key receiving opening faces in a substantially downward direction from said bar.

10. The device according to claim 9 wherein said lock covering handle further comprises:

a laterally extending flange portion protruding from an end of said handle for limiting access to said locking means.

11. The device according to claim 7 wherein said locking means includes:

a push button combination lock.

12. A tamper resistant anti-theft device for attachment to an automobile steering wheel having a center mounted air bag and an exterior diameter of a selected size, the anti-theft device comprising:

an elongated bar having first and second ends and adapted to have a length greater than the exterior diameter of the steering wheel to which the anti-theft device is to be attached;

engaging means fixed at the first end of said bar for engaging a first portion of the steering wheel, said engaging means including a hook and a first spacer;

a second spacer fixed at a position between the ends of said bar for engaging a second opposed portion of the steering wheel;

a closing latch mounted on said bar by a pin assembly for movement from an opened position to a closed position, said closing latch and said second spacer defining an enclosure for confinement of the second portion of the steering wheel when said closing latch is in said closed position;

a first reinforcing block fixedly attached between said hook and first spacer, said block extending generally perpendicularly in an upward direction from said bar, thereby preventing the cutting of an immediately adjacent portion of said steering wheel;

a second reinforcing block fixedly attached to said closing latch between said handle and said second spacer, thereby preventing the cutting of an immediately adjacent portion of said steering wheel;

a lock covering handle attached to and extending away from said closing latch and projecting a distance away from a front surface of said bar; and a locking means for locking the closing latch in the closed position fixedly attached along said bar, said locking means positioned between said front surface of said bar and an inside surface of said handle when said closing latch is in said closed position.

13. The device according to claim 12 wherein said pin assembly comprises:

a slide pin mounted on an inside surface of said closing latch; and a hollow guide box mounted on a rear surface of said bar, said guide box having a longitudinal groove extending along the length thereof for interaction with said slide pin to guide the longitudinal movement of said closing latch along said bar.

14. The device according to claim 12 wherein said locking means includes:

a locking pin extendable into an aperture on an underside surface of said handle so as to secure said closing latch against movement relative to said first engaging means.

15. The device according to claim 14 wherein said locking means further comprises:

a key receiving opening.

16. The device according to claim 14 wherein said locking means further comprises:

a push button combination lock.

* * * * *